(12) United States Patent
Watkins, Jr. et al.

(10) Patent No.: US 8,777,746 B2
(45) Date of Patent: Jul. 15, 2014

(54) GESTURES TO ENCAPSULATE INTENT (75) Inventors: Oliver (Lake) T. Watkins, Jr., Toronto (CA); Yousuf Chowdhary, Maple (CA); Jeffrey Brunet, Richmond Hill (CA); Ravinder (Ray) Sharma, Toronto (CA)

(73) Assignee: 2343127 Ontario Inc. (CA)

( * ) Notice: Subject to any disclaimer, the term of this patent is extended or adjusted under 35 U.S.C. 154(b) by 0 days.

(21) Appl. No.: 13/616,222

(22) Filed: Sep. 14, 2012

(65) Prior Publication Data
US 2013/0079140 A1  Mar. 28, 2013

Related U.S. Application Data (60) Provisional application No. 61/626,204, filed on Sep. 23, 2011.

(51) Int. Cl.
*G06F 17/00* (2006.01)
(52) U.S. Cl.
USPC ............................................ 463/37

(58) Field of Classification Search
USPC ........................... 463/20, 25, 33–38
See application file for complete search history.

(56) References Cited

U.S. PATENT DOCUMENTS

| 8,368,662 | B2* | 2/2013 | Argiro | 345/173 |
| 2009/0143141 | A1* | 6/2009 | Wells et al. | 463/37 |
| 2012/0133615 | A1* | 5/2012 | Argiro | 345/174 |
| 2013/0093702 | A1* | 4/2013 | Argiro | 345/173 |

* cited by examiner

*Primary Examiner* — Ronald Laneau (57) ABSTRACT

A method is provided for enabling gameplay with a character in a game environment on a mobile device. In the game environment, a player can play a game via a character. When there is an expectation of action from the character in the game, a touch gesture input is received on the mobile device. The fidelity of the touch gesture input is calculated with reference to an optimal gesture in a reference gesture table. If the fidelity is within a predefined range associated with the optimal gesture, the touch gesture input is matched to the optimal gesture and an associated game script is called wherein the character would be shown as having successfully completed the expectation.

28 Claims, 6 Drawing Sheets

GESTURES TO ENCAPSULATE INTENT

CROSS REFERENCE TO RELATED APPLICATION

This application claims priority from U.S. Provisional Application No. 61/626,204 filed on Sep. 23, 2011, which is incorporated by reference in its entirety herein.

FIELD OF INVENTION

The present invention is related to video game applications in general and touch-screen interaction in video game applications in particular.

BACKGROUND OF THE INVENTION

A virtual world is a computer simulated environment. A virtual world may resemble the real world, with real world rules such as physical rules of gravity, geography, topography, and locomotion. A virtual world may also incorporate rules for social and economic interactions between virtual characters. Players (users) may be represented as avatars, two or three-dimensional graphical representations. Virtual worlds may be used for massively multiple online role-playing games, for social or business networking, or for participation in imaginary social universes.

Virtual objects are non-physical objects in virtual worlds, online communities or online games. Virtual objects may include but are not limited to virtual characters, avatars, digital clothing for avatars, weapons, tokens, digital gifts, etc. or any other virtual objects used for gameplay.

Traditionally, players have interacted with gaming applications using game controllers with dedicated buttons. In game controllers with dedicated buttons, one button can have different actions associated with it depending on the context. For example, the same button can pick a gun, load the gun, shoot the gun, start the car and drive away since all of these actions are sequential. When operations are parallel, classic context cannot be used to assign different operations to the same button depending on the context.

Similarly, playing the same game(s) using a touch-screen device by employing gestures lacks the accuracy that is provided by the dedicated game controllers and their many buttons. The present invention seeks to address at least some of these limitations of the prior art and provide a unique method and a system for interacting with virtual objects.

SUMMARY OF THE INVENTION

This application describes systems and methods for gestures to encapsulate user intent. In one embodiment of the invention, using the systems and methods of the invention simplifies the user interface design so that for touch-screen devices which, unlike game controllers have no dedicated buttons to play a game, a better user experience can be achieved. The system and method of the invention gives the user the benefit of the doubt, without making a game either automatic or too easy to play.

Challenges in a gaming application keep the user engaged. There are good challenges which increase the user interaction and make the game enjoyable. There are also bad challenges which stem from bad design, lack of accuracy in the interface, etc. that tend to frustrate the user and decrease their enjoyable user experience. The idea of this invention is to decrease the amount/number of bad challenges by providing a system and method that encapsulates the user intent.

Classic context-sensitive controls assume a 1-to-1 correspondence between actions and targeted objects. Only one action is performed for a given object, and a user may activate only one given object at a time. For a user to perform multiple actions, these actions must be performed in sequence upon many different target objects, or they must be incorporated into a preset 'combo' which is largely object agnostic.

The present invention is neither strictly target object dependent nor object agnostic, with neither 1-to-1 correspondence nor sequential inputs necessary to signal intent for multiple actions. Instead, parallel actions result from user input within a realm of expected or optimal actions. Effectively, this gives the user the benefit of the doubt within the context of multiple objects, allowing the player's avatar to respond appropriately to each object in parallel.

This provides for a richer gaming experience and increases player engagement while making the gameplay of the virtual world more involved. The systems and methods described here enable a player to have a unique and more enjoyable gaming experience.

According to a first aspect of the invention, a method is provided for enabling gameplay with a character in a game environment on a mobile device. In the game environment, a player can play a game via a character. When there is an expectation of action from the character in the game, a touch gesture input is received on the mobile device. The fidelity of the touch gesture input is calculated with reference to an optimal gesture in a reference gesture table. If the fidelity is within a predefined range associated with the optimal gesture, the touch gesture input is matched to the optimal gesture and an associated game script is called wherein the character would be shown as having successfully completed the expectation.

If the fidelity is not within the predefined range associated with the optimal gesture, the touch gesture input is matched to a suboptimal gesture in the reference gesture table and an associated game script is called wherein the character would be shown as having failed to complete the expectation.

The touch gesture input may be an arc or line component of a continuous multi-part gesture.

The fidelity range may be narrower (e.g., the standard to reach "optimal" may be more stringent or exacting) if there is a static or dynamic object in the character's path.

Preferably, the speed of the touch gesture input is taken into account in assessing its fidelity to the optimal gesture. Preferably, the timing of the touch gesture input is taken into account in assessing its fidelity to the optimal gesture.

Multiple touch gesture inputs (such as those received on a multi-touch enabled mobile device) may be detected and processed in parallel. Alternatively, multiple touches may be aggregated together and treated as one touch gesture input for the purpose of calculating and matching to an optimal or suboptimal gesture in the reference gesture table.

In one embodiment, a straight line gesture represents a running action. An arc gesture may represent a jumping action. An up angled gesture may represent a jumping action to a higher position. A down angled gesture may represent a ducking action or a jumping action to a lower position.

Preferably, an optimal straight line gesture includes a range of gestures that are not perfectly straight or that are not perfectly horizontal. Preferably, an optimal arc gesture includes a range of gestures that are not perfectly arc-shaped or are not necessarily completely round. Preferably, an optimal angle gesture includes a range of angles with the same general heading or direction.

The optimal gesture in the reference gesture table may depend on the game context. In the game context, all possible outcomes of the expectation are preferably represented as either an optimal or suboptimal gesture in the reference gesture table. This game context further includes any static objects in the character's path. Likewise, the game context preferably includes the position and trajectory of any dynamic objects or non-player characters in the character's path at the moment when the player gesture is initiated.

In one embodiment, the game is a platform game. In this example, a straight line gesture may refer to running on a platform, while an arc or angled line gesture may refer to jumping to another platform.

A touch gesture input may include interaction with a virtual object, such as a weapon. It may also be inferred from the game context that a player's character desires to interact with a virtual object (e.g. draw a weapon), even if the gesture would otherwise be interpreted strictly as a movement gesture (e.g. running, jumping).

Preferably, the reference gesture table is stored in persistent memory. The reference gesture table may be stored on the mobile device.

In one embodiment, the expectation comprises a sequence of discrete actions by the character that can be invoked with a single touch gesture input (e.g. run and duck under a ledge). The expectation may also comprise a plurality of parallel actions (e.g. run and draw a sword) that can be invoked by a single touch gesture input.

DETAILED DESCRIPTION

Methods and arrangements of gestures to encapsulate user intent for virtual worlds and gaming applications are disclosed in this application.

Before embodiments of the invention are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A "virtual world" as used herein need not be a "game" in the traditional sense of a competition in which a winner and/or loser is determined, but rather that the term "game" incorporates the idea of a virtual world. Moreover, a person or entity who enters the virtual world in order to conduct business, tour the virtual world, or simply interact with others or the virtual environment, with or without competing against another person or entity is still considered to be "playing a game" or engaging in the gameplay of the game.

Virtual worlds can exist on game consoles for example Microsoft Xbox, and Sony Playstation, Nintendo Wii, etc., or on online servers, or on mobile devices (e.g. an iPhone or an iPad), Smartphones, portable game consoles like the Nintendo 3DS, or on a PC (personal computer) running MS Windows, or MacOS, Linux or another operating system. This list is not exhaustive but is exemplary of devices or computing environments where virtual worlds can exist, many other variations are available and known to persons skilled in the art.

A computer or a game console that enables a user to engage with a virtual world, including a memory for storing a control program and data, and a processor (CPU) for executing the control program and for managing the data, which includes user data resident in the memory including a set of gameplay statistics. The computer, or a game console, may be coupled to a video display such as a television, monitor, or other type of visual display while other devices may have it incorporated in them (iPad). A game or other simulations may be stored on a storage media such as a DVD, a CD, flash memory, USB memory or other type of memory media. The storage media can be inserted to the console where it is read. The console can then read program instructions stored on the storage media and present a game interface to the user.

The term "player" is intended to describe any entity that accesses the virtual world, regardless of whether or not the player intends to or is capable of competing against other players. Typically, a player will register an account with the game console within a peer-to-peer game and may choose from a list or create virtual characters that can interact with other virtual characters of the virtual world.

The term "engage in gameplay" generally implies playing a game whether it is for the purpose of competing, beating, or engaging with other players. It also means to enter a virtual world in order to conduct business, tour a virtual world, or simply interact with others or a virtual environment, with or without competing against another entity.

Typically, a user or a player manipulates a game controller to generate commands to control and interact with the virtual world. The game controller may include conventional controls, for example, control input devices such as joysticks, buttons and the like. Using the controller a user can interact with the game, such as by using buttons, joysticks, and movements of the controller and the like. This interaction or command may be detected and captured in the game console. The user's inputs can be saved, along with the game data to record the game play.

Another method to interact with a virtual world is using the touch screen. Current methods define simple ways of using the touch screen for this interaction. A gesture refers to a motion used to interact with multipoint touch screen interfaces. Multi-touch devices employ gestures to perform various actions. Some examples are given below:

Swipe: On iOS devices (iPhone, iPad etc.), a one-finger swipe is used to unlock the device. On Blackberry OS6 devices one-finger swipe is used to scroll through different menus on the homescreen and other screens within the OS.

Pinch: A pinch refers to pinching together the thumb and finger, and is used to zoom out on an image.

Reverse Pinch: A reverse pinch (sometimes also called "unpinch") refers to spreading two fingers (or thumb and finger) apart, and is used to enlarge a picture or zoom in on an image.

A virtual object may comprise any one of a virtual character of an online game, a virtual good of an online game, a weapon of an online game, a vehicle of an online game, virtual currency of an online game, experience points of an online game and permissions of an online game etc. A virtual object may further be any item that exists only in a virtual world (game).

Virtual good may include virtual money, experience points, weapons, vehicles, credentials, permissions and virtual gold. A player's online persona may obtain these virtual goods via game-play, purchase or other mechanisms. For example, as a player of a first person shooter completes various levels of the game, he obtains additional weapons, armor, outfits, experience points and permissions. Additional weapons and armor which may be beneficial in facilitating the completion of levels and allow the player to perform in new and different ways may be acquired (i.e. purchased). Additional permissions may unlock additional levels of the game or provide access to an otherwise hidden forum or stage. Whatever the items, players are constantly in search of virtual goods to enrich their game experience.

A virtual character may include a persona created by a player or chosen from a list in the virtual world. Typically virtual characters are modeled after humans whether living or fantasy (e.g. characters from mythology).

A virtual character is represented by one or more gameplay statistics, which encapsulate some meaning to connect the virtual (and digital) reality of the game to the real world. Many of these statistics are not apparent to the user as such, but are instead encoded within the framework of the game or composed together to form a script. In role-playing games (RPGs) and similar games, these statistics may be explicitly exposed to the user through a special interface, often with added meaning which provides context for the user's actions.

In virtual worlds (video/computer games) a non-player character (NPC) is a virtual character that is controlled by the program and not a player. NPC may also refer to other entities not under the direct control of players. NPC behavior in a virtual world may be scripted and automatic.

A player character or playable character (PC) is a virtual character in a virtual world that is controlled or controllable by a player. A player character is a persona of the player who controls it. In some cases, a virtual world has only one player character. In other cases, there may be a small number of player characters from which a player may pick a certain virtual character that may suit his or her style of gameplay. In other scenarios, there may be a large number of customizable player characters available from which a player may choose (and/or define) a virtual character of their liking. An avatar may include the physical embodiment of a virtual character in the virtual world.

Figure 1:
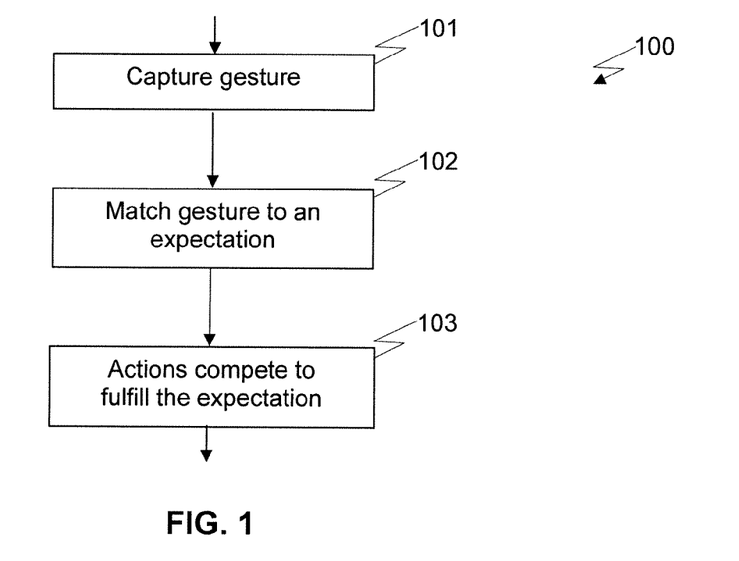
FIG. 1 is a flow diagram illustrating the primary steps of the method, according to a preferred embodiment.

According to one embodiment of the invention, a system is provided with a virtual world where the player can interact with virtual objects using a touch screen. As shown in FIG. 1 (a flow diagram highlighting conceptually certain aspects of the method), a touch is first detected to capture a gesture 101. There are several methods for touch screen implementations e.g. a capacitive screen or a resistive screen. Touch-screens as a human interface device (HID) technology, for example to replace the computer mouse, is becoming increasingly popular and provide for a unique way of interacting with the computer. There are several different technological ways of implementing this. Some of the more popular methods widely used in the industry are described below.

Resistive touch-screens are touch-sensitive displays composed of two flexible sheets coated with a resistive material and separated by an air gap or microdots. When contact is made to the surface of the touch-screen, the two sheets are pressed together. There are horizontal and vertical lines on these two screen that when pushed together, register the precise location of the touch. Because the touch-screen senses input from contact with nearly any object (finger, stylus/pen, palm) resistive touch-screens are a type of "passive" technology.

Capacitive sensing is a technology based on capacitive coupling that is used in many different types of sensors, including those for detecting and measuring: proximity, position or displacement, humidity, fluid level, and acceleration. Capacitive sensors are used in devices such as laptop trackpads, MP3 players, computer monitors, cell phones and others. Capacitive sensors are used widely for their versatility, reliability and robustness, providing a unique human-device interface and cost reduction over mechanical switches. Capacitive touch sensors now feature prominently in a large number of mobile devices e.g. Smartphones, MP3 players etc.

In surface capacitance, only one side of the insulator is coated with a conductive layer. A small voltage is applied to the conductive layer, resulting in a uniform electrostatic field. When a conductor, such as a human finger, touches the uncoated surface, a capacitor is dynamically formed. The sensor's controller can determine the location of the touch indirectly from the change in the capacitance as measured from the four corners of the panel. This kind of touch screen has no moving parts; therefore, it is moderately more durable but has limited resolution. It is also prone to false signals from parasitic capacitive coupling, and needs calibration during manufacturing. It is therefore most often used in simple applications such as industrial controls and kiosks.

Although a few exemplary touch-screen technologies are described above, the methods and systems described in this application are intended to work with any kind of a touch-screen technology.

A virtual world that incorporates the invention, either in its entirety or some components of it, may be a single player game or a multiplayer game or a MMORPG (Massively Multiplayer Online Role Playing Game) and may exist on any type of a gaming device which provides a touch interface, and may include but not limited to an iPhone, iPad, Smartphones, Android phones, personal computers e.g. laptops, tablet computers, touch-screen computers, gaming consoles and online server based games being played via a touch-screen capable interface etc.

The computer program comprises: a computer usable medium having computer usable program code, the computer usable program code comprises: computer usable program code for presenting graphically to the player the different options available to engage in gameplay via the touch-screen interface.

As mentioned earlier, the term "engage in gameplay" generally implies playing a game whether it is for the purpose of competing, beating, or engaging with other players. It also means to enter a virtual world in order to conduct business, tour a virtual world, or simply interact with others or a virtual environment, with or without competing against another entity.

The system determines whether the touch input is greater than the threshold (i.e. a real touch, not an incidental contact). Then, the gesture is identified and matched to an expectation 102.

Actions can be thought of as "competing" to fulfill the expectation 103. That is, for each part of the expectation (which may be several steps (or actions) long), the associated user gesture is matched to an optimal or suboptimal reference gesture. This in turn leads to an outcome. The system allows for approximation (within a range), so that a gesture that is similar in timing, speed and shape to the optimal gesture will result in successful completion of the individual step or action. Imperfect gestures, therefore, are not an automatic failure. However, the system does not tolerate every possible kind of imperfect gesture, therefore, the game stays competitive and interesting for the player.

Several exemplary embodiments/implementations of the invention are given below. There may be other methods obvious to persons skilled in the art, and the intent is to cover all such scenarios. The application is not limited to the cited examples, but the intent is to cover all such areas that may be used in a virtual world.

Figure 2:
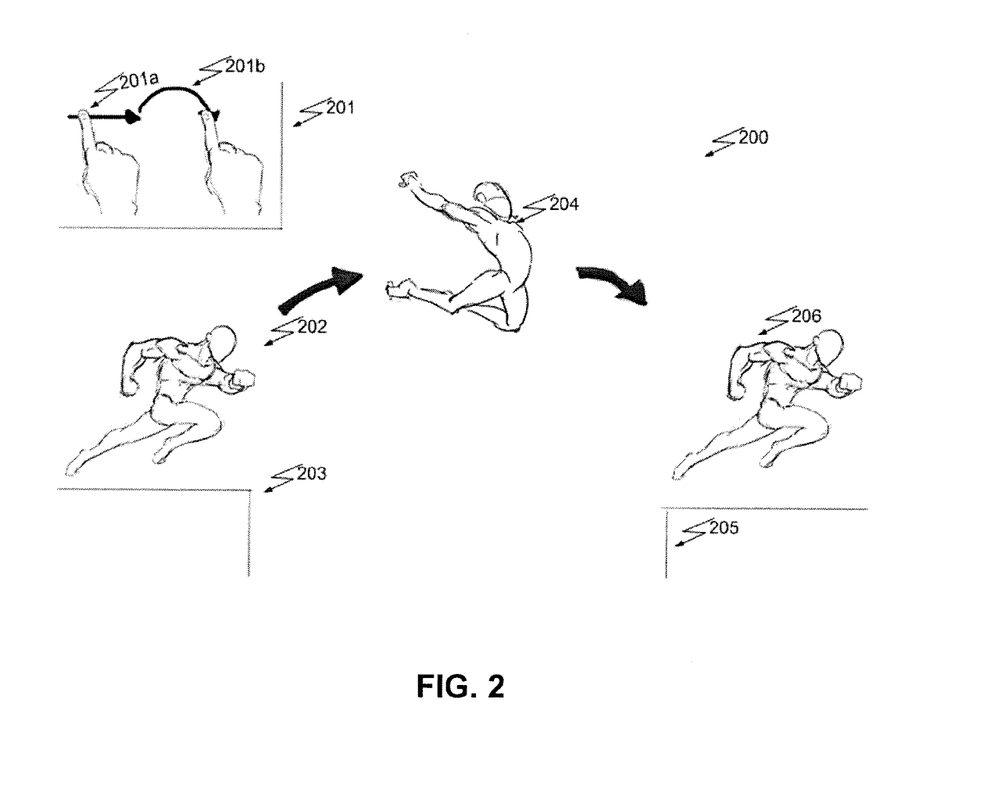
FIG. 2 is a conceptual diagram of a platform game in which an action of jumping between platforms is illustrated (showing the associated optimal gesture to achieve this expectation).

FIG. 2 shows an example of a running platformer genre of virtual games. In this embodiment, a player provides an input by performing a gesture as outlined in 201 via a touch screen. A gesture 201 is provided by the player that may be composed of one or more components 201a and 201b. In response, the virtual character 202a runs on platform 203, then leaps 204 and finally lands 206 on platform 205 and continues to run.

The terms user and player are synonymous in the context of this application, and refer to the human who is providing the inputs via the touch screen.

In one embodiment, the implementation of the gesture 201 and the resultant action that the virtual character 202 performed are provided by first calculating all the possible interactions that the virtual character could have for example it jumps across successfully (in response to a well timed gesture), jumps but misses and falls in the pit between platform 203 and platform 205 (in response to a poorly timed, or inappropriate gesture). These pre-calculated interactions may be stored in the persistent memory of the game. Once a player provides the input via a gesture e.g. 201, the gesture is matched with the most appropriate interaction. The timing of the gestures is most critical when matching them with the most appropriate pre-calculated interactions.

As mentioned above, the gesture may be composed of more than one part. Thus if the player provides an input where the gesture component 201a is too fast and gesture component 201b is too slow then one possible interaction is that the virtual character 202 continues to run on platform 203 too fast and jumps too late as a result falling in the pit between platforms 203 and 205 as a result of a poorly timed gesture.

High fidelity gestures are described in the examples given here (i.e. the gestures correspond closely to optimal gestures, so that the expected actions are successfully completed). The player inputted gesture is compared with the optimal gesture, and if the correspondence between the input gesture and the optimal gesture is close, then a script showing completion of the action is shown.

The degree of difference between an optimal gesture and an suboptimal gesture is called 'fidelity' and is calculated by finding the inverse of the difference in magnitude and direction between an optimal and suboptimal straight gesture, or by finding the inverse of the difference in the arc-length and curvature between an optimal and suboptimal arcing gesture. If the fidelity of a gesture is within a predefined range associated with the optimal gesture, then the player's virtual character succeeds in completing the associated action. If the fidelity of a gesture is too low (possibly because of sloppy touches, or too few touches or poorly timed strokes), the player's virtual character fails in completing the associated action. Circumstances can affect the levels of these thresholds naturally within the simulation. For example, in FIGS. 3-5, it is possible to have high fidelity for the running portion, as well as for the landing portion of the jump, but still fail because the bullet fired by the enemy forced a higher fidelity threshold for the player's virtual character 302 at the start of the jump; a failed timing at the start of the jump results in the player's virtual character being shot by the bullets being fired from the gun 306 held by the enemy virtual character 305.

As described in the prior art, two methods exist for initiating actions based upon user input. In the first method, there is a one-to-one correspondence between an input (or set of inputs as in a gesture) and the action initiated, such that the input can be deduced from any resulting action. In the second method, there is a one-to-one correspondence between an action and a context and a one-to-one correspondence between an input and the initiation of an action in a given context, such that the same input will always initiate an action in a given context, and that action will always be the same for that context once initiated.

The present invention introduces the innovation whereby there exists a one-to-one correspondence between an action and a context but a many-to-one or one-to-many correspondence between a set of inputs (as in a gesture) and the initiation of actions in a given context. Thus, many (similar or different) actions may result from a set of inputs for any given context. For example, to calculate which actions result from a set of inputs in a platforming game, the following process may preferably be employed:

1. Use Hierarchical Dynamic A* in order to determine the clearest path from start to finish for a given level.
   a. Perform a first order of approximation
      i. Calculate a straight line from start to finish of the current level, this is the 'Direct Path' ii. Calculate a straight line from start to finish of each platform such that this discontinuous line is as close as possible to the Direct Path, this is the 'Indirect Path'
iii. Correct for the discontinuities in the Indirect Path by adding a parabolic arc between each platform, these correspond to each 'Jump'
iv. Trace a player's progress along the path, when a static obstacle is encountered, query all possible actions for an action that best fits this context (as in a Blackboard architecture), e.g., apply a Jump to a Pit
v. Adjust the Indirect Path to account for the optimal action initiated in response to each static object
vi. Record and later allow for sub-optimal actions to be initiated in response to each static object
vii. Repeat (i)-(vi) for all Indirect Paths between the start and finish of the level, these are the 'Corrected Paths'
b. Perform a second order of approximation
  i. Repeat (a)(i)-(a)(vii) for all corrected paths, but this time accounting for dynamic objects whose timings are known for each Corrected Path (e.g., enemies that jump at a certain frequency, fire as soon as the player's virtual character comes into view, etc. initiate these actions at known times based upon the start time of a level and the path taken)
  ii. If timings are not known, generate new Corrected Paths that account for each possible dynamic object's state, and thus, each context
c. Record these Corrected Paths for use when a player next plays the level, associating an optimal gesture to correspond to the set of actions associated with each encounter with a static or dynamic object or set of objects As a player's virtual character advances through a level, it will follow one of the Corrected Paths, and for each encounter with a static or dynamic obstacle, a pre-cached set of actions is stored. One of these pre-cached actions will be selected based upon the fidelity of a player's input gesture to the optimal gesture of the given encounter. An optimal gesture will select the optimal set of actions for a given encounter, whereas a sub-optimal gesture will select a sub-optimal set of actions for that encounter. A lack of input or a poorly rated gesture will result in no action (or an incorrect action) being taken, which will usually result in some sort of penalty being applied to a player's virtual character. Methods for rating the fidelity of a player's input gesture are described below.

Figure 3:
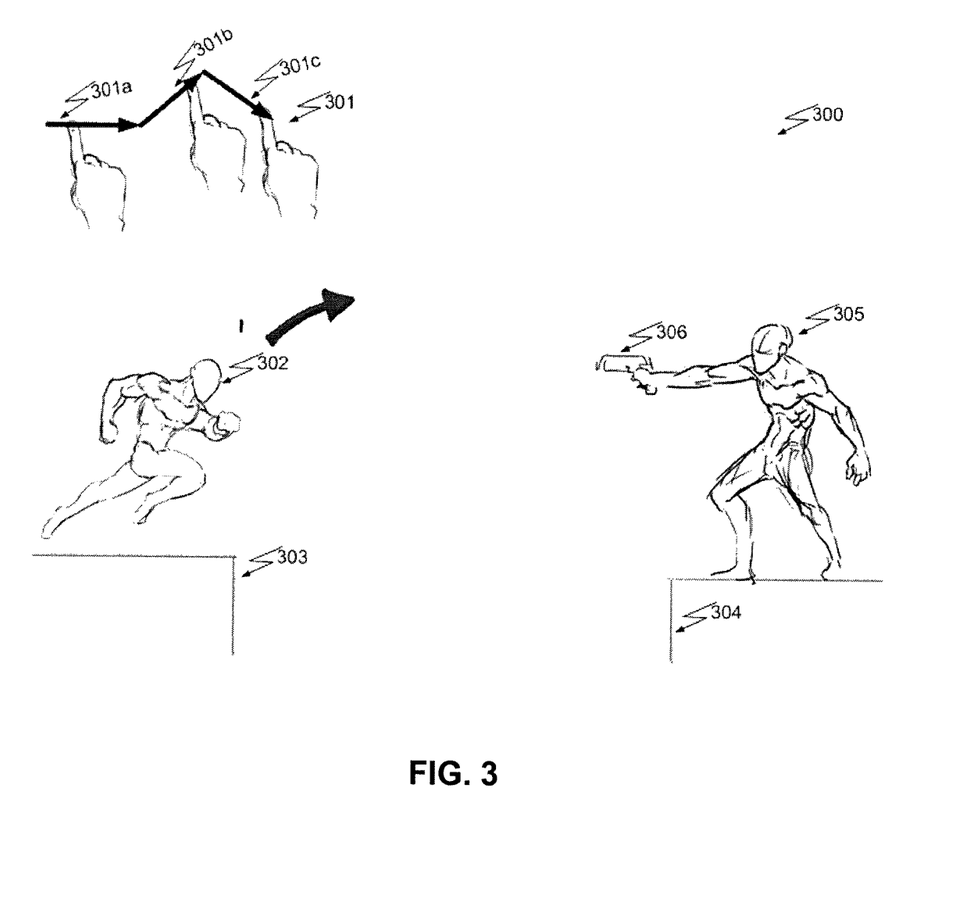
FIGS. 3-5 are conceptual diagrams of a gesture having three sub-components and the related outcome of each sub-component.

FIG. 3 shows an enemy virtual character 305 (enemy) using a gun 306 to fire bullets at the player's virtual character 305. There are three obstacles that the player's virtual character 302 needs to surmount: 1) jump over the pit that exists between platform 303 and platform 304, 2) dodge the enemy's fire, and 3) defeat the enemy 305.

Figure 4:
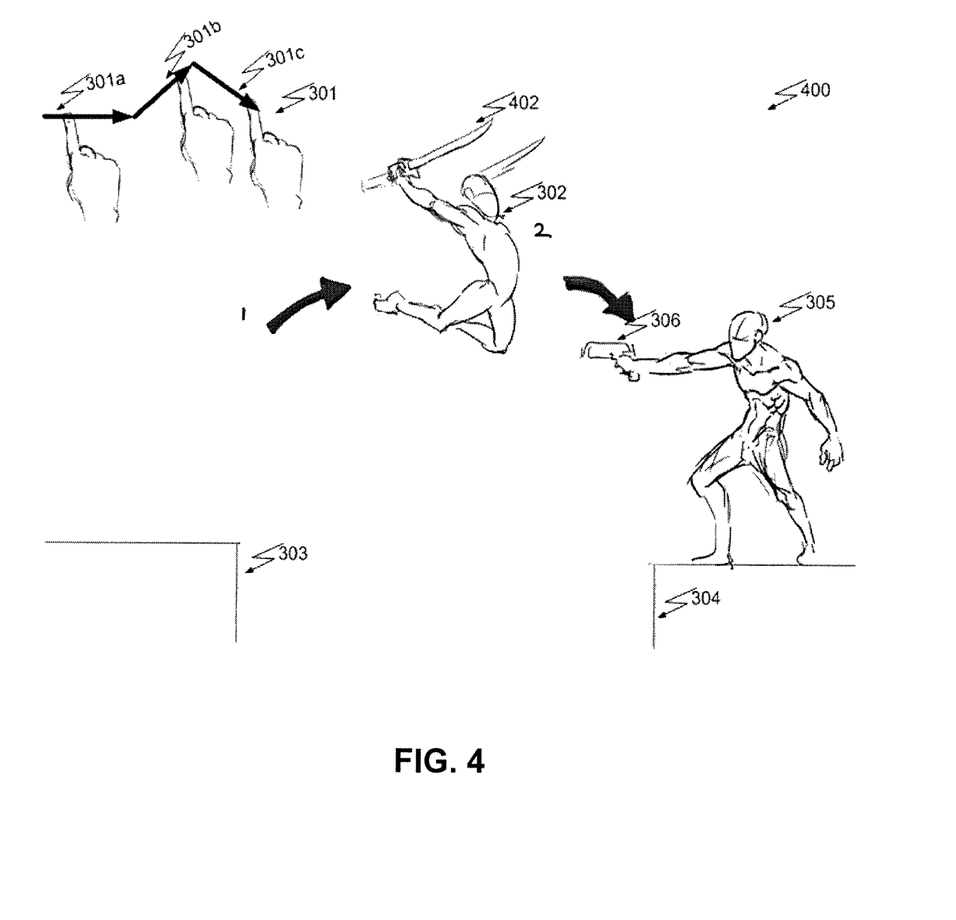
Figure 5:
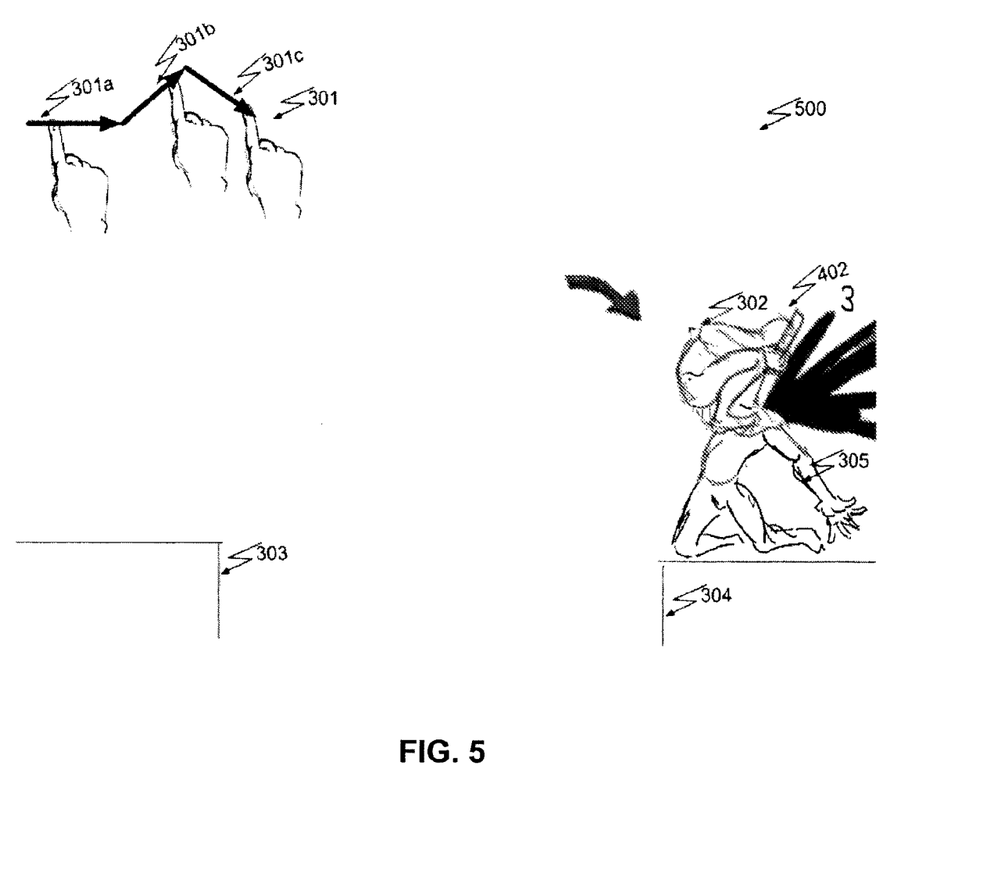

As shown in FIG. 3, gesture 301 may be composed of one or more components 301a, 301b and 301c. FIGS. 3, 4 and 5 show the different interaction sub-parts that the virtual character 302 performs as a result of the player's input of the gesture on a touch screen.

In FIG. 3 the player's virtual character 302 runs on platform 303 towards the enemy virtual character 305 standing on platform 304 and holding a firing gun 306.

In FIGS. 3, 4 and 5, there are static obstacles (e.g. the gap between the platforms 303 and 304) and there are dynamic obstacles (e.g. the bullets being fired from the gun 306 held by the enemy virtual character 305). If the two platforms 303 and 304 were moving away or towards each other then the pit between them would also be a dynamic obstacle.

The time gap between two bullets fired by enemy virtual character 305 provides the most optimal opportunity for virtual character 302 to jump and attack virtual character 305. Thus if the player's input gestures were poorly timed, virtual character 302 may jump too early, too late, jump short and fall in the pit etc., all less than perfect interactions.

In FIG. 4, the second sub-part of the interactions is shown. Virtual character 302 leaps from the platform 303, draws its swords 402 while it is still in mid-air. By leaping, virtual character 302 has also dodged the bullets that may be coming from the gun 306 being held by enemy virtual character 305 standing on platform 304.

In the third and final sub-part, the virtual character 302 lands on the shoulders of enemy virtual character 305 and stabs it with swords 402. Thus virtual character 302 has jumped from platform 303 to platform 304 avoiding the pit in between, while also dodging the bullets from gun 306 and also successfully neutralizing the enemy virtual character 305 as a result of the well timed gesture input that the player provided.

If the gesture 301 was poorly timed by the player, as the result, the virtual character 302 may have:
a) run too fast and fallen in the pit between platform 303 and 304;
b) jumped not high enough to dodge the bullets;
c) landed in front of the enemy virtual character 305 and come in line of the bullets;
d) leapt too hard and landed behind the enemy virtual character 305 thus may be missing its bullets but also missing an opportunity to neutralize/defeat it.

Thus, we see that the timing of the gesture 301 and its sub-parts 301a, 301b and 301c is critical in terms of matching it with the possible interactions.

Figure 6:
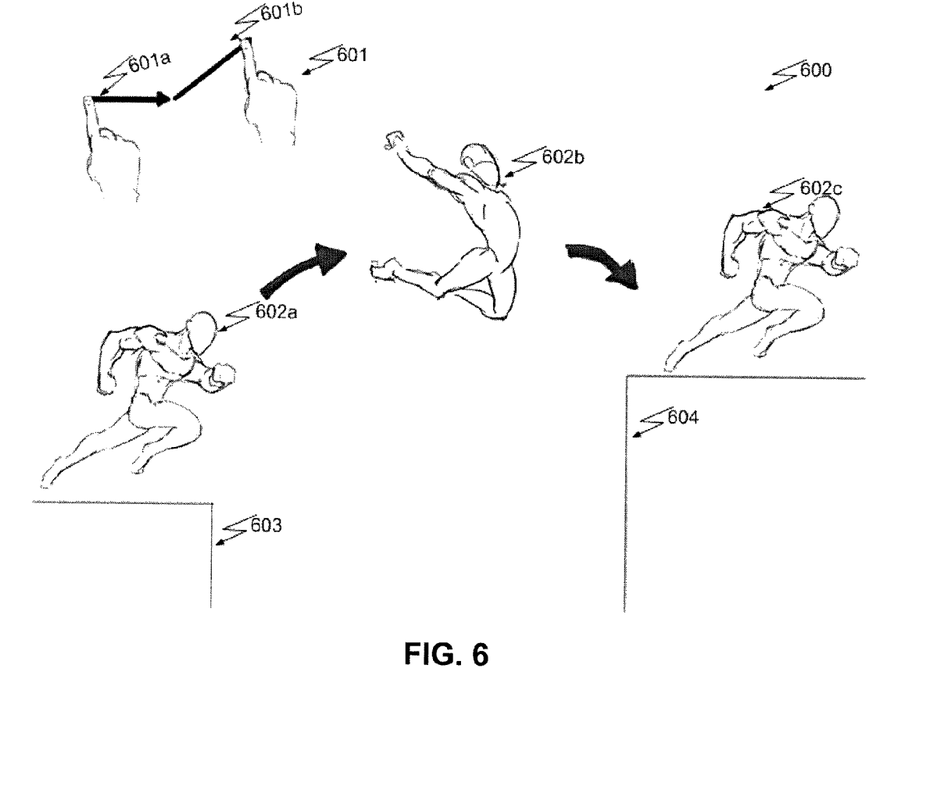
FIG. 6 is a conceptual diagram of a sample gesture showing a sequence of actions inferred from the game context.

Similar to FIG. 2, one embodiment of a response to the player input gestures is represented in FIG. 6. The player's virtual character 602 must cross the gap between platform 603 and platform 604. This begins with a high and long jump 602a, followed by a mid-air dive 602b, and finally ending in a landing 602c on platform 604 while continuing to run towards another obstacle.

In general, if a player inputs a gesture of "x" components where "x" represents the number of components input (2 in this case), then their in-game virtual character may execute up to 2× or twice as many actions (up to 4 in this case) to respond to obstacles. The quality of these responses is directly proportionate to the fidelity of the player's inputs compared to the optimal input pattern.

The optimal input pattern can be described as a series of input gestures consisting of one or more components. Thus, the optimal input pattern for a jump over a pit as in FIG. 2 might consist of a horizontal stroke 201a (representing the running portion) followed by an upward arc stroke 201b (representing the jump portion) with the start and end of the arc stroke coinciding with the walkable area of the platform. Sub-optimal input patterns, such as the lack of a horizontal stroke, a less than perfectly curved arc stroke, or a misplaced start of the arc stroke might still result in the player's virtual character successfully jumping over the pit, depending on the degree by which these inputs are off the mark.

Figure 7:
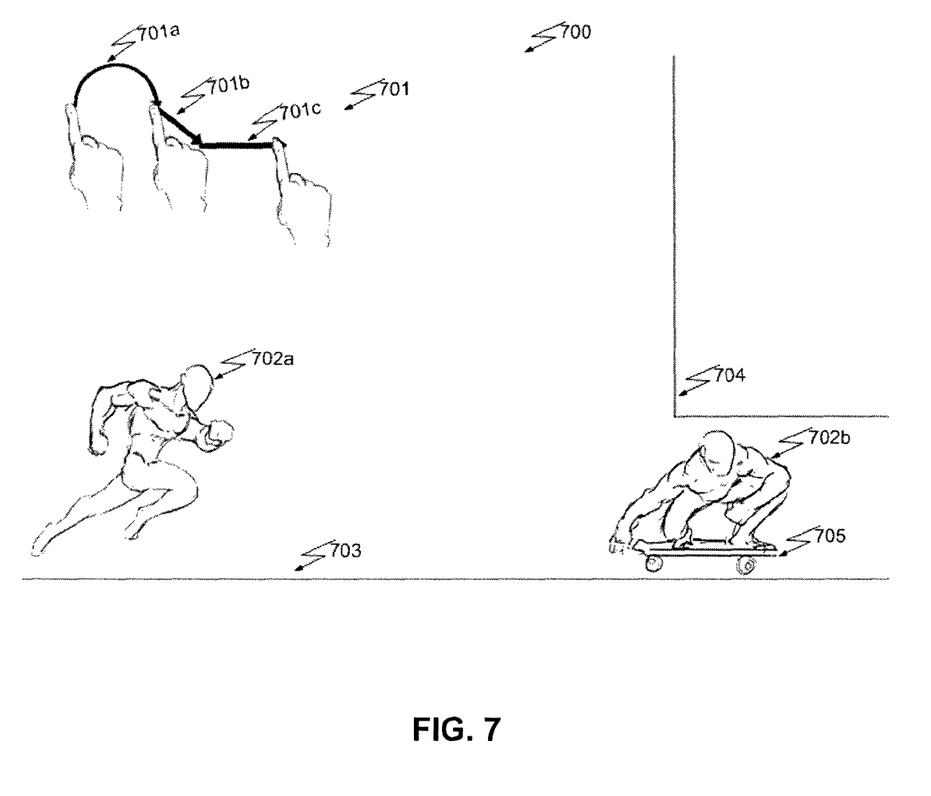
FIG. 7 is a conceptual diagram of another sample gesture showing a sequence of actions inferred from the game context.

FIG. 7 above shows another embodiment showing a gesture 701 that is composed of sub-parts 701a, 701b and 701c. The player's virtual character 702a runs on platform 703, lands on the skateboard 705, ducks on the skateboard 702b to avoid the ledge 704. Thus, if the player's input is timed properly, the virtual character 702a is able to land perfectly on the skateboard 705 and squeeze into the gap between platform 703 and ledge 704.

If the player's input was poorly timed, the virtual character 702a may be unable to land properly on the skateboard 705 or may duck too late, thus colliding with the ledge 704.

The velocity with which a player's fingers are moved across the touch-screen either in a straight line or in a arc (circular motion) or a combination of one or more (e.g. an arc 701a, an angulated straight line 701b, and a horizontal straight line 701c) to form a gesture 701 as exemplified above, may also have an effect on the virtual object.

Virtual objects in a virtual world interact with the player, the virtual environment, and each other. This interaction is generally governed by a physics engine which enables realism in modeling physical rules of the real world (or arbitrary fantasy worlds). A physics engine is a computer program that using variables such as mass, force, velocity, friction and wind resistance may simulate and predict effects under different conditions that would approximate what happens in either the real world or a fantasy world. A physics engine can be used by other software programs for example games or animation software to enhance the way virtual objects imitate the real world to produce games and animations that are highly realistic or to create dream-world effects.

The force F applied on a virtual object at a location (x, y) is determined by the following:

$$F(x, y) = \sum_{i=0}^{n} \frac{p_i \times f_i}{\sqrt{(x - x_i)^2 + (y - y_i)^2}}$$

Where:
n=number of influences
fi=force applied by influence at index i on object
pi=priority of influence at index i for object
(xi, yi)=position of influence at index i The force or priority of a particular influence may be determined by an equation (such as a membership function for a fuzzy set), it may be a static property of the influence itself, or it may be a static property of the object being influenced. An example of each is described below.

Suppose that there are three influences applying forces to a virtual character. Each influence has a position, magnitude, direction, and priority. As above, the sum of these influential forces applied over a distance, times a specific priority, determines the final force to be applied to the game character.

Thus, if a virtual character's health is low, then the flee influence's priority is higher than the attack influence's priority. In contrast, when the virtual character's health is high the attack influence has higher priority. The move influence is indifferent to the virtual character's health, as it is determined by the placement and pressure of the player's fingers, i.e. the multiple touch points registered on the touch screen.

Health is a game mechanic used in virtual worlds to give a value to virtual characters, enemies, NPCs, (non player characters) and related virtual objects. Health is often abbreviated by HP which may stand for health points or hit points; it is also synonymous with damage points or heart points. In virtual worlds health is a finite value that can either be numerical, semi-numerical as in hit/health points, or arbitrary as in a life bar, and is used to determine how much damage (usually in terms of physical injury) a virtual character can withstand when said virtual character is attacked, or sustains a fall. The total damage dealt (which is also represented by a point value) is subtracted from the virtual character's current HP. Once the virtual character's HP reaches 0 (zero), the virtual character is usually unable to continue to fight or carry forward the virtual world's mission.

A typical life bar is a horizontal rectangle which may begin full of colour. As the virtual character is attacked and sustains damage or mistakes are made, health is reduced and the coloured area gradually reduces or changes colour, typically from green to red. At the start of a typical game, the virtual character may have 10 health and be surrounded by numerous enemies. At some point, the life bar changes colour completely or loses colour, at this point the virtual character is usually considered dead.

The above examples are not intended to be limiting, but are illustrative and exemplary. In fact, the system and method of invention may use any other gestures that are relevant to the context of the virtual game or application.

One embodiment of the invention may preferably also provide a framework or an API (Application Programming Interface) for virtual world creation that allows a developer to incorporate the functionality of disclosed patent application. Using such a framework or API allows for a more uniform virtual world generation, and eventually allows for more complex and extensive ability to interact with virtual objects.

It should be understood that although the term game has been used as an example in this application but in essence the term may also imply any other piece of software code where the embodiments of the invention are incorporated. The software application can be implemented in a standalone configuration or in combination with other software programs and is not limited to any particular operating system or programming paradigm described here. For the sake of simplicity, game applications were used as examples. Similarly users of these applications are described as players. There is no intent to limit the disclosure to game applications or player applications. The terms players and users are considered synonymous and imply the same meaning. Likewise, virtual worlds, games and applications imply the same meaning. Thus, this application intends to cover all applications and user interactions described above and ones obvious to persons skilled in the art.

Although interacting with virtual objects has been exemplified above with reference to gaming, it should be noted that virtual objects are also associated with many industries and applications. For example, virtual worlds/objects can be used in movies, cartoons, computer simulations, and video simulations, among others. All of these industries and applications would benefit from the disclosed invention.

The examples noted here are for illustrative purposes only and may be extended to other implementation embodiments. While several embodiments are described, there is no intent to limit the disclosure to the embodiment(s) disclosed herein. On the contrary, the intent is to cover all alternatives, modifications, and equivalents obvious to those familiar with the art.

What is claimed is:

1. A method of enabling gameplay with a character in a game environment on a mobile device, comprising:
    providing a game environment in which a player can play a game via a character;
    when there is an expectation of action from the character in the game, receiving a touch gesture input on the mobile device;
    calculating fidelity of the touch gesture input to an optimal gesture in a reference gesture table; and
    if the fidelity is within a predefined range associated with the optimal gesture, matching the touch gesture input to the optimal gesture and calling an associated game script wherein the character would be shown as having successfully completed the expectation.

2. The method of claim 1, wherein if the fidelity is not within the predefined range associated with the optimal gesture, matching the touch gesture input to a suboptimal gesture in the reference gesture table and calling an associated game script wherein the character would be shown as having failed to complete the expectation.

3. The method of claim 1, wherein the touch gesture input is an arc or line component of a continuous multi-part gesture.

4. The method of claim 1, wherein the fidelity range is narrower if there is a static or dynamic object in the character's path.

5. The method of claim 1, wherein the speed of the touch gesture input is taken into account in assessing its fidelity to the optimal gesture.

6. The method of claim 1, wherein the timing of the touch gesture input is taken into account in assessing its fidelity to the optimal gesture.

7. The method of claim 1, wherein multiple touch gesture inputs are detected and processed in parallel.

8. The method of claim 1, wherein multiple touches are aggregated together and treated as one touch gesture input for the calculating and matching steps.

9. The method of claim 1, wherein a straight line gesture represents a running action.

10. The method of claim 1, wherein an arc gesture represents a jumping action.

11. The method of claim 1, wherein an up angled gesture represents a jumping action to a higher position.

12. The method of claim 1, wherein a down angled gesture represents a ducking action or a jumping action to a lower position.

13. The method of claim 1, wherein an optimal straight line gesture includes a range of gestures that are not perfectly straight or that are not perfectly horizontal.

14. The method of claim 1, wherein an optimal arc gesture includes a range of gestures that are not perfectly arc-shaped or are not necessarily completely round.

15. The method of claim 1, wherein an optimal angle gesture includes a range of angles with the same general heading or direction.

16. The method of claim 1, wherein the optimal gesture in the reference gesture table depends on the game context.

17. The method of claim 16, wherein all possible outcomes of the expectation in the game context are either an optimal or suboptimal gesture in the reference gesture table.

18. The method of claim 16, wherein the game context includes any static objects in the character's path.

19. The method of claim 16, wherein the game context includes the position and trajectory of any dynamic objects or non-player characters in the character's path at the moment when the player gesture is initiated.

20. The method of claim 1, wherein the game is a platform game.

21. The method of claim 20, wherein a straight line gesture refers to running on a platform.

22. The method of claim 20, wherein an arc or angled line gesture refers to jumping to another platform.

23. The method of claim 20, wherein a touch gesture input includes interaction with a virtual object.

24. The method of claim 23, wherein the object is a weapon.

25. The method of claim 1, wherein the reference gesture table is stored in persistent memory.

26. The method of claim 1, wherein the reference gesture table is stored on the mobile device.

27. The method of claim 1, wherein the expectation comprises a sequence of discrete actions by the character that can be invoked with a single touch gesture input.

28. The method of claim 1, wherein the expectation comprises a plurality of parallel actions that can be invoked by a single touch gesture input.

* * * * *